(12) United States Patent
Prakash et al.

(10) Patent No.: US 11,656,904 B2
(45) Date of Patent: May 23, 2023

(54) COORDINATING EVENT-DRIVEN OBJECT EXECUTION

(71) Applicant: AVEVA SOFTWARE, LLC, Lake Forest, CA (US)

(72) Inventors: Ravi Kumar Herunde Prakash, Lake Forest, CA (US); Sung Chung, Walnut, CA (US)

(73) Assignee: AVEVA SOFTWARE, LLC, Lake Forest, CA (US)

(*) Notice: Subject to any disclaimer, the term of this patent is extended or adjusted under 35 U.S.C. 154(b) by 148 days.

(21) Appl. No.: 17/136,435

(22) Filed: Dec. 29, 2020

(65) Prior Publication Data
US 2021/0224111 A1   Jul. 22, 2021

Related U.S. Application Data

(63) Continuation of application No. 16/201,656, filed on Nov. 27, 2018, now Pat. No. 10,908,951, which is a continuation of application No. 15/136,138, filed on Apr. 22, 2016, now Pat. No. 10,152,360.

(51) Int. Cl.
  *G06F 9/48*   (2006.01)
(52) U.S. Cl.
  CPC .................. *G06F 9/4881* (2013.01)
(58) Field of Classification Search
  CPC .................................................. G06F 9/4881
  See application file for complete search history.

(56) References Cited

U.S. PATENT DOCUMENTS

| | | | |
|---|---|---|---|
| 5,812,773 A | 9/1998 | Norin | |
| 9,811,434 B1 | 11/2017 | Wagner | |
| 2006/0235786 A1* | 10/2006 | DiSalvo | G06Q 40/04 705/37 |
| 2008/0040171 A1 | 2/2008 | Albers | |
| 2010/0293549 A1 | 11/2010 | Brelsford et al. | |
| 2011/0247003 A1 | 10/2011 | Fong et al. | |
| 2012/0042256 A1 | 2/2012 | Jamjoom et al. | |
| 2014/0237476 A1 | 8/2014 | Stetten et al. | |
| 2015/0015412 A1 | 1/2015 | Abbassian et al. | |
| 2015/0067104 A1 | 3/2015 | Curry et al. | |
| 2015/0178124 A1 | 6/2015 | Modani et al. | |
| 2015/0199218 A1* | 7/2015 | Wilson | G06F 9/5011 718/104 |
| 2016/0027037 A1* | 1/2016 | Cai | G06Q 30/0246 705/14.42 |
| 2016/0061625 A1 | 3/2016 | Wang | |
| 2017/0109199 A1 | 4/2017 | Chen | |
| 2017/0124350 A1 | 5/2017 | Reihman et al. | |

OTHER PUBLICATIONS

Sohpia Antipolis, 7th Junior Research Workshop on Real-Time Computing; JRWRTC 2013; (Year: 2013).*

* cited by examiner

*Primary Examiner* — Dong U Kim
(74) *Attorney, Agent, or Firm* — Greenberg Traurig, LLP (57) ABSTRACT

Coordinating scheduled events and aperiodic events to execute objects to extract, transform, and load data from source systems to a structured data store. An event manager process executing on a server runtime utilizes event suspension, consolidation, and sequencing techniques to ensure that only one event process is executed for a particular time range.

18 Claims, 4 Drawing Sheets

COORDINATING EVENT-DRIVEN OBJECT EXECUTION

CROSS REFERENCE

This application is a continuation of U.S. patent application Ser. No. 16/201,656, filed Nov. 27, 2018, which is a continuation of U.S. patent application Ser. No. 15/136,138, filed Apr. 22, 2016, now U.S. Pat. No. 10,152,360, issued Dec. 11, 2018, the entire contents of which are incorporated by reference herein.

TECHNICAL FIELD

Aspects of the present disclosure generally relate to manufacturing intelligence. More particularly, aspects relate to systems and methods for providing near real-time object execution to extract, transform, and load raw data from manufacturing intelligence source systems to a structured data store.

BACKGROUND

Manufacturing intelligence systems provide graphical representations of information models that are multidimensional data models to represent business logic and relationships between various unstructured source data items. Conventional systems configure information models to run in accordance with a predetermined schedule to periodically extract, transform, and load data from source systems to an intelligence data store. Periodically executing objects in accordance with a predetermined schedule may lead to decreased performance. For example, scheduling object execution too frequently results in extra and unnecessary utilization of processor resources and network bandwidth. Scheduling object execution too infrequently results in data not being available for analysis for a period of time. The static and rigid nature of a schedule is not flexible enough to handle unpredictable events that cannot be scheduled, such as reconciliation of past data due to errors, unexpected beginning and/or end of work orders, incorrect data entry that has been corrected in a source system, and the like.

SUMMARY

Aspects of the disclosure improve operation of computerized manufacturing intelligence systems by reducing extra and unnecessary utilization of processor resources and network bandwidth while flexibly handling unpredictable data issues. Aspects of the disclosure further provide a server runtime environment capable of coordinating scheduled system events and aperiodic user-requested events to execute objects to extract, transform, and load data from source systems to a structured data store.

In an aspect, a server computing device comprises a processor and processor-executable instructions stored on a computer-readable storage medium of the server computing device. The processor-executable instructions include instructions that, when executed by the processor, implement a runtime environment including a scheduler process, an on-demand process, and an event manager process. The runtime environment is adapted to execute one or more model objects corresponding to a process device within a continuous process. The scheduler process implements one or more of the system events in accordance with a periodic schedule and the on-demand process implements one or more aperiodic user events in response to receiving a request for the user events from a user device. The event manager process synchronizes implementation of the system events and the user events and executes the model objects in response to the synchronized implementation of the system events and the user events.

In another aspect, a computer-implemented method includes performing, by a scheduler process of a runtime environment, system events in accordance with a periodic schedule. An on-demand process of the runtime environment performs user-requested events in response to receiving one or more aperiodic requests for the user-requested events from a user device. An event manager process of the runtime environment synchronizes the performance of the system events and the user-requested events. The runtime environment executes one or more model objects corresponding to process devices in a continuous process in response to the synchronized performance of the system events and the user-requested events.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
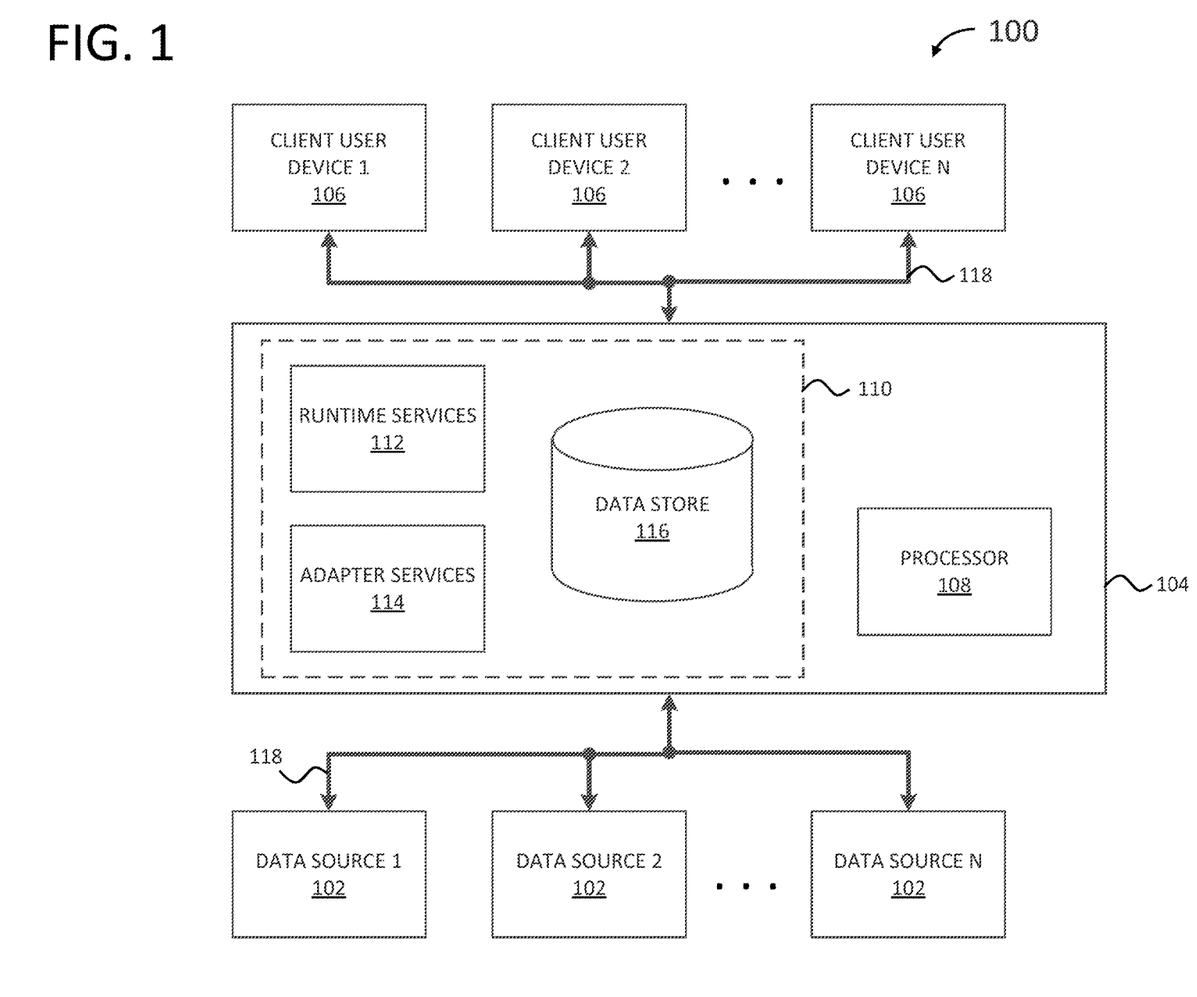
FIG. 1 illustrates an exemplary system within which aspects of the disclosure may be incorporated.

FIG. 1 illustrates an exemplary system, generally indicated at 100, within which an embodiment of the disclosure may be incorporated. The system 100 includes one or more data sources 102, a server computing device 104, and one or more client user devices 106. The server computing device 104 includes a processor 108 and intelligence data services 110. The intelligence data services 110 include runtime services 112, adapter services 114, and a data store 116. In an embodiment, aspects of system 100 are communicatively coupled via a communications infrastructure 118. In accordance with an aspect of the disclosure, intelligence data services 110 are embodied on a computer-readable memory storage device.

The data sources 102 are adapted to store data indicative of one or more values corresponding to devices of a continuous process (e.g., a plant). In an exemplary embodiment, objects (e.g., measures or dimensions) comprise data stored on data sources 102. The data sources 102 are further adapted to provide the stored data to the server computing device 104. In an embodiment, data sources 102 are connected to server computing device 104 via one or more plug-in components, such as data adapters (e.g., adapter services 114). The data sources 102 may each comprise a server computing device, an operational historian database, an object linking and embedding (OLE) database, a performance indicator (PI) historian database, and the like in accordance with an aspect of the disclosure. Exemplary data stored and provided by data sources 102 includes, but is not limited to, operations and performance data, operational historian data, OLE data, PI data, and the like.

The intelligence data services 110 are adapted to, when executed by processor 108, retrieve, relate, and aggregate data from data sources 102. In accordance with an aspect of the disclosure, a measure is a group of one or more calculations that share the same context. In an embodiment, a measure comprises calculations for each source system, time period, and/or each unique combination of dimension value. Exemplary measures include, but are not limited to, sales volume, margin contribution, schedule adherence, energy deviation, performance, quality, run rate, target run rate, utilization, and the like.

In accordance with another aspect of the disclosure, a dimension is a structure that provides context to measures. In an embodiment, each dimension stores related items of data. In another embodiment, a dimension stores contextual data. A dimension enables filtering, grouping, and labeling of measure data, in accordance with an aspect of the disclosure. Exemplary dimensions include, but are not limited to, customer, product, shift, line, machine, equipment, item, job, and the like.

In accordance with a further aspect of the disclosure, relating a measure to a dimension establishes a context. In an embodiment, a context link provides a context for time-slicing and time-slices obtained from time defining dimensions may have an associated context. In an embodiment in which runtime services 112 process a measure, runtime services 112 validate and ensure that only one process is executed during a particular time range.

The communications infrastructure 118 is capable of facilitating the exchange of data among various components of system 100, including data sources 102, server computing device 104, and client user devices 106. The communications infrastructure 118 in the embodiment of FIG. 1 includes a local area network (LAN) that is connectable to other telecommunications networks, including other LANs or portions of the Internet or an intranet. The communications infrastructure 118 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 118 is any medium that allows data to be physically transferred through serial or parallel communication channels (e.g., copper wire, optical fiber, computer bus, wireless communication channel, etc.). In an embodiment, communications infrastructure 118 comprises at least in part a process control network. In another embodiment, communications infrastructure 118 comprises at least in part a SCADA system. In yet another embodiment, communications infrastructure 118 comprises at least in part an enterprise manufacturing intelligence (EMI)/operational intelligence (OI) system.

Figure 2:
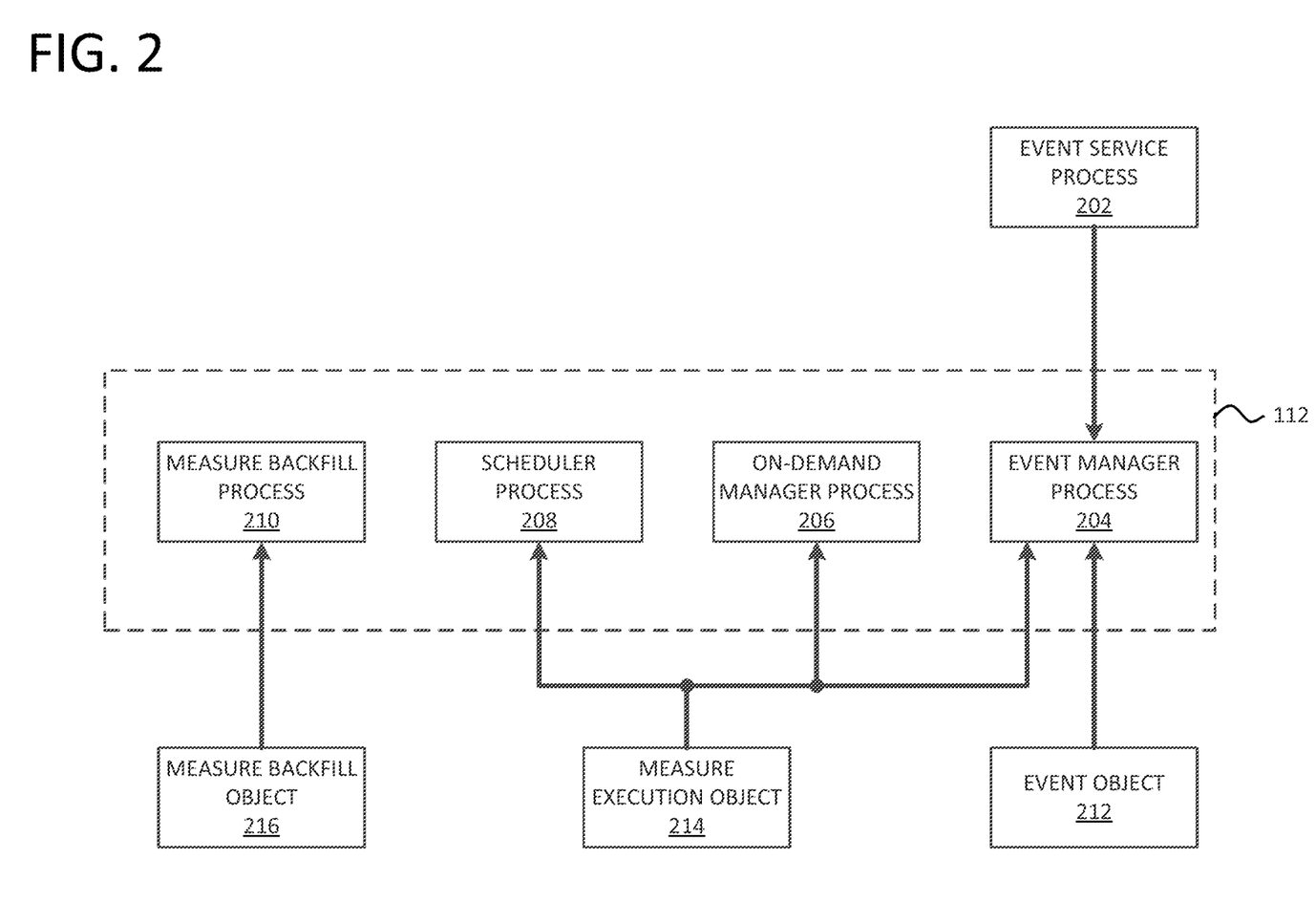
FIG. 2 illustrates an exemplary function block diagram of database processes and objects according to an embodiment.

FIG. 2 illustrates an exemplary system and method for a high-level architecture event in accordance with an aspect of the disclosure. The illustrated embodiment includes an event service process 202, an event manager process 204, an on-demand manager process 206, a scheduler process 208, a measure backfill process 210, an event object 212, a measure execution object 214, and a measure backfill object 216. In accordance with an embodiment of the disclosure, the event manager process 204, the on-demand manager process 206, the scheduler process 208, and the measure backfill process 210 comprise runtime services 112.

In accordance with an aspect of the disclosure, an external system places an event request (e.g., ad-hoc request, aperiodic request, etc.) to execute a measure or a dimension by calling the event service process 202. In an exemplary embodiment, a client user device 106 transmits an event request to event service process 202 executing on server computing device 104 by calling an add method of the event service process 202. In an embodiment, the event request is referred to as a user-requested event. The event manager process 204, executing on runtime services 112 of server computing device 104, is adapted to interact with event service process 202 for adding events corresponding to event requests. In an embodiment, event manager process 204 processes event requests in a first in, first out (FIFO) order. In accordance with an aspect of the disclosure, supported events include a dimension refresh event, a measure refresh event, and a measure date range execution event.

In accordance with a further aspect of the disclosure, event manager process 204 synchronizes (e.g., coordinates) system events (e.g., measures backfill process 210, scheduler process 208) with user-requested events. For example, event manager process 204 is configured to place a user-requested event on a "wait" according to embodiments of the disclosure. When a user-requested event is for a time period in the past for which the backfill is yet to be processed, event manager process 204 is capable of placing the user-requested event on a wait. The user-requested event is then processed once the backfill for that time period completes. And when the time period for which a user-requested event is currently being processed by one of the system events, event manager process 204 is capable of placing the user-requested event on a wait. The user-requested event is then processed once the system event for that time period completes.

The event manager process 204 is also configured to consolidate user-requested events and system events according to embodiments of the disclosure. When the user-requested event is the same time period for which one or more system events are currently processing, event manager process 204 is capable of automatically consolidating the user-requested event and the system event to avoid redundant processing. When the user-requested event is close to the time period for which one or more system events are currently processing (e.g., within ten minutes), event manager process 204 is capable of automatically consolidating the user-requested event and the system event to avoid redundant processing.

In an embodiment in which there are full or partial overlapping time periods for various events (e.g., four events, etc.) being processed, event manager process 204 is configured to utilize a sequence of events mechanism (e.g., a time-based consolidation of durations) to pick the event with the superset period that represents all the conflicting events so that a valid and consistent set of time slices are processed as per the model configuration. In an embodiment, aspects of the disclosure enable user-requested events to be raised in any frequency, order, or time as they occur.

Referring further to FIG. 2, event manager process 204 executes an add event and/or de-queue event for event object 212 in accordance with an embodiment of the disclosure. Co-pending, co-owned U.S. patent application Ser. No. 15/136,290, entitled CONSOLIDATING MANUFACTURING INTELLIGENCE EVENT QUEUE ITEMS, filed on the same day as this application, discloses logic for queuing and de-queuing events and is incorporated herein in its entirety by reference. In accordance with a further aspect of the disclosure, event manager process 204, on-demand manager process 206, and/or scheduler process 208 captures new execution data when executing a measure, such as measure execution object 214. The event manager process 204, on-demand manager process 206, and/or scheduler process 208 also process the measure (e.g., scheduler, time-defining dimension, or event) and check the measure execution object 214 to avoid overlapping time periods. In an embodiment, the event manager process 204, on-demand manager process 206, and scheduler process 208 do not process events with overlapping time periods and instead wait for a subsequent iteration to process the events to avoid the overlap condition. In accordance with another aspect of the disclosure, measure backfill process 210 captures execution data from data store 116 when executing a measure, such as measure backfill object 216. In an embodiment, event manager process 204, on-demand manager process 206, scheduler process 208, and measure backfill process 210 execute in parallel. In another embodiment, event manager process 204 synchronizes (e.g., coordinates) execution of on-demand manager process 206, scheduler process 208, and measure backfill process 210.

A scheduler (e.g., scheduler process 208), a time-defining dimension (e.g., on-demand manager process 206), an event (e.g., event manager process 204), and/or a backfill (e.g., measure backfill process 210) execute one or more measures in accordance with aspects of the disclosure. In an embodiment, data is captured from data store 116 during an execution time period to avoid the overlapping execution on the runtime (e.g., runtime services 112).

In an embodiment, events process objects (e.g., measures or dimensions) at the same time objects are refreshed by a scheduler (e.g., scheduler process 208), which may cause redundant refreshing of objects. In accordance with an aspect of the disclosure, scheduler process 208 purges objects before they are executed. For example, purging objects avoids redundant refreshing of objects.

In another embodiment, scheduler process 208 purges any event requests that are in a pending status for the same object which is available under an events table (e.g., Model.EventQueue) when there is a refresh of scheduler process 208. The event objects may be dimension objects or measure objects. These objects that are running under scheduler process 208 (e.g., during a scheduler refresh) verify that the object exists in the events. When the object exists, scheduler process 208 purges the event objects by updating a status of the object to reflect a "purged" identifier and deletes the records from the events table. In an embodiment, the events table is available in data store 116.

In accordance with an aspect of the disclosure, a trigger is available on the events table. In an embodiment, the trigger is disabled by default and enabled upon a command, such as insert, update, delete, and the like. When a user enables the trigger (e.g., via client user devices 106), it will insert the records into the events table. The trigger can also be enabled by making changes in a configuration file (e.g., EMIRuntimeConfigurator.xml, setting an EnableEventQueueHistory key to true). In another embodiment, a table (e.g., Model.EventQueue_History) is utilized to track the status of the objects.

Figure 3:
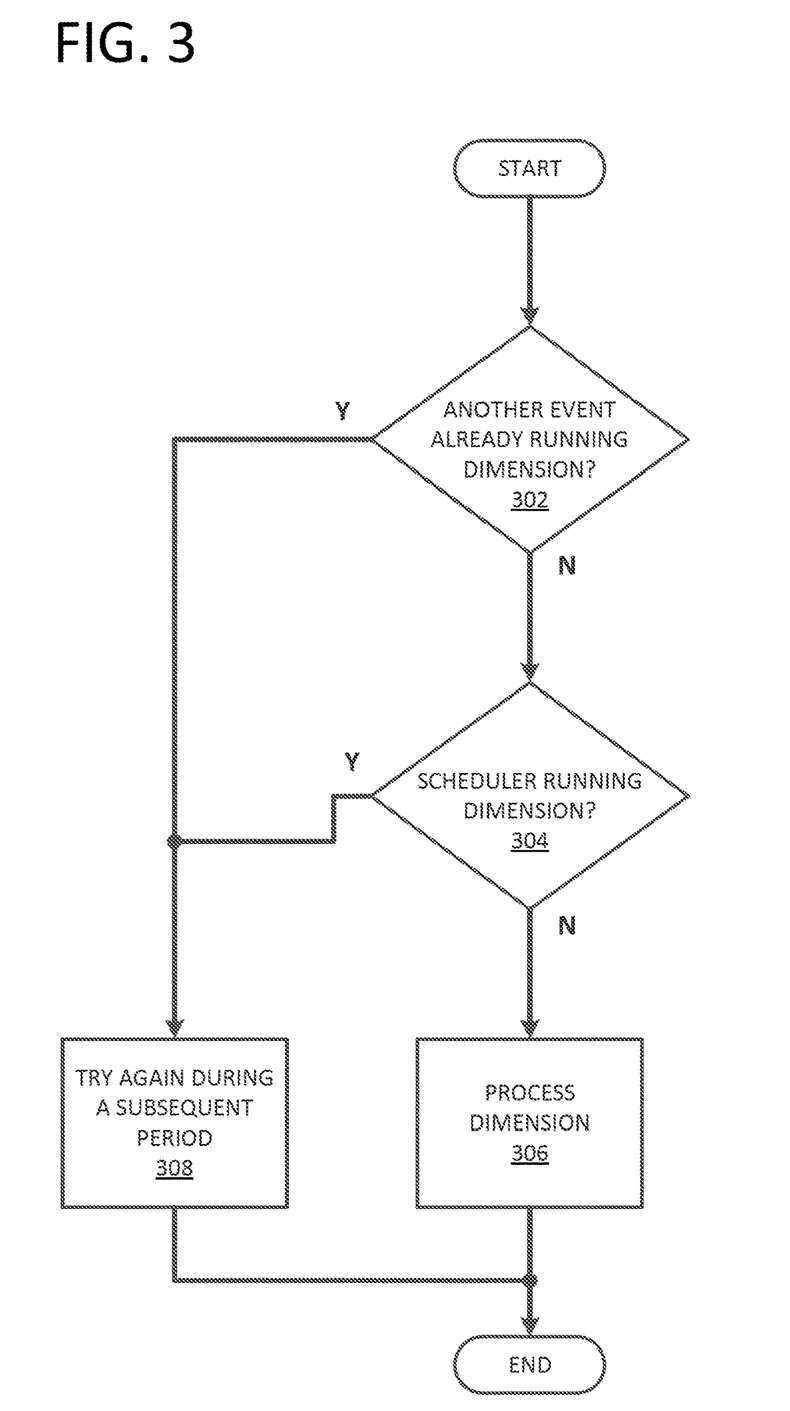
FIG. 3 illustrates an exemplary dimension event process according to an embodiment.

FIG. 3 illustrates an exemplary dimension event process in accordance with an aspect of the disclosure. When a dimension event is received from a data source 102 (e.g., a database), runtime services 112 execute the dimension (e.g., run the dimension code as per the specifications in the model) when the dimension is not already being executed by scheduler process 208. When the dimension is already being executed, runtime services 112 place the event back (e.g., transmit back to data source 102) and set the status to a pending state for processing during a subsequent time period.

Referring further to FIG. 3, runtime services 112 determine whether another event is already running a dimension received from one or more data sources 102 at step 302. When runtime services 112 determine another event is already running the dimension, the process continues to step 308. When runtime services 112 determine another event is not already running the dimension, the process continues to step 304. At step 304, runtime services 112 determine whether the dimension is running by a scheduler (e.g., scheduler process 208). When runtime services 112 determine the scheduler is running the dimension, the process continues to step 308. When runtime services 112 determine the scheduler is not running the dimension, the process continues to step 306. The runtime services 112 process the dimension at step 306. At step 308, runtime services 112 try processing the dimension at a subsequent time period and do not process the dimension at a current time.

Figure 4:
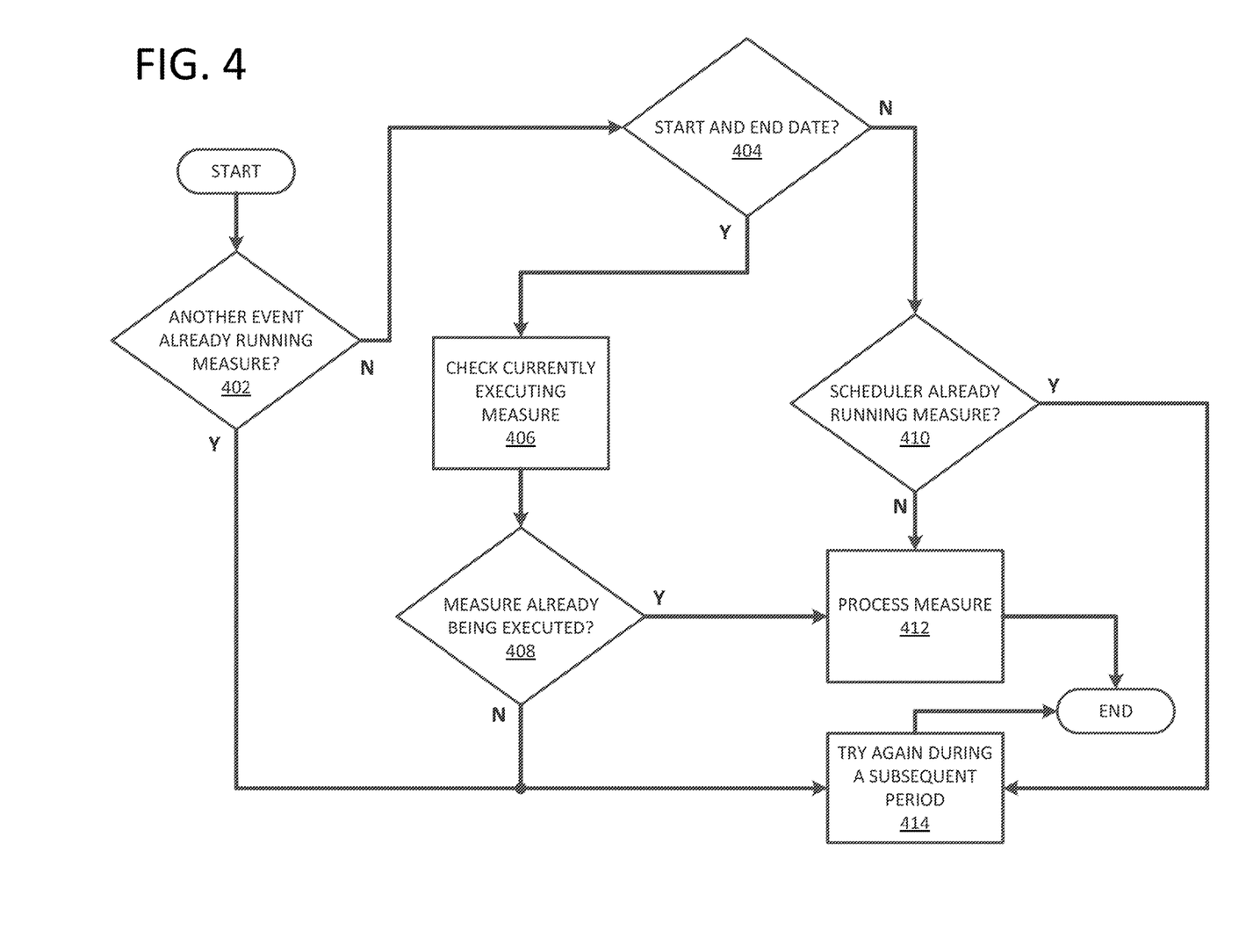
FIG. 4 illustrates an exemplary measure event process according to an embodiment.

FIG. 4 illustrates an exemplary measure event process in accordance with an aspect of the disclosure. As described above, event manager process 204, on-demand manager process 206, scheduler process 208, and measure backfill process 210 can each execute a measure. In an exemplary embodiment, a measure called production-good is scheduled for a five minute update and uses the shift dimension as a time-defined dimension. The time slices may be executed by each of event manager process 204, on-demand manager process 206, scheduler process 208, and/or measure backfill process 210. In an embodiment, measure backfill process 210 handles the reverse backfill execution after the deployment, scheduler process 208 handles the refresh execution, on-demand manager process 206 handles the measure update as a result of a time-defined dimension (TDD) update, and event manager process 204 handles an external measure event. In another embodiment, runtime services 112 provides data integrity by checking the processes 204, 206, 208, 210 and preventing more than one of the processes from executing an overlapping date range. In other words, there is only one process executing for a particular time range.

Referring further to FIG. 4, an exemplary check process performed by runtime services 112 is illustrated. At step 402, runtime services 112 determine whether another event is already executing the measure. When runtime services 112 determine another event is already running the measure, the process continues to step 414, described further below. When runtime services 112 determine another event is not already running the measure, the process continues to step 404. At step 404, runtime services determine whether the event has a start date and an end date. When runtime services 112 determine the event has a start date and an end date, the process continues to step 406. At step 406, runtime services 112 check the currently executing measure. In an embodiment in which a scheduler (e.g., scheduler process 208) and/or an on-demand TDD queue (e.g., on-demand manager process 206) are running on the measure, runtime services 112 check if the event is running for the same date range. In an embodiment in which a backfill (e.g., measure backfill process 210) is running on the measure, runtime services 112 ensure that an event date range has completed by the backfill. The process then continues to step 408 where runtime services 112 determine whether the measure is already being executed. When runtime services 112 determine the measure is not already being executed, the process continues to step 414. When runtime services 112 determine the measure is already being executed, the process continues to step 412. Returning to step 404, when runtime services 112 determine the event does not have a start date and an end date, the process continues to step 410. At step 410, runtime services 112 determine whether a scheduler (e.g., scheduler process 208) is already running the measure. When runtime services 112 determine a scheduler is not already running the measure, the process continues to step 412 in which runtime services 112 process the measure. When runtime services 112 determine at step 410 a scheduler is already running the measure, the process continues to step 414. At step 414, runtime services 112 try processing the measure at a subsequent time period and do not process the measure at a current time.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for improving operation of computerized manufacturing intelligence system by reducing extra and unnecessary utilization of processor resources and network bandwidth comprising:
    one or more computers comprising one or more processors and one or more non-transitory computer readable media, the one or more non-transitory computer readable media including instructions stored thereon that when executed cause the one or more computers to:
        implement, by the one or more processors, a runtime environment,
        implement, in the runtime environment, an event manager process,
        implement, in the runtime environment, a scheduler process, and
        implement, in the runtime environment, an on-demand process;
    wherein the scheduler process is configured to implement one or more system events in accordance with a periodic schedule;
    wherein the on-demand process is configured to implement one or more aperiodic user-requested events in response to receiving a request for the one or more aperiodic user-requested events from a user device; and
    wherein the event manager process is configured to synchronize the one or more system events with the one or more aperiodic user-requested events.

2. The system of claim 1,
    wherein the event manager process is configured to cause the one or more aperiodic user-requested events a to wait to process when the one or more aperiodic user-requested events are for a time period for which the one or more system events are yet to be processed.

3. The system of claim 2, wherein the event manager process is configured to process the one or more aperiodic user-requested events once the one or more system events processing completes.

4. The system of claim 2, wherein the event manager process, the on-demand manager process, and/or the scheduler process are configured to check a measure to avoid overlapping time periods.

5. The system of claim 4, wherein the event manager process, on-demand manager process, and/or scheduler process are configured to capture new execution data when executing the measure.

6. The system of claim 4, wherein the event manager process, the on-demand manager process, and/or the scheduler process are configured to not process events with overlapping time periods.

7. The system of claim 6, wherein the event manager process, the on-demand manager process, and/or the scheduler process wait for a subsequent iteration to process the events to avoid an overlap condition.

8. The system of claim 1, wherein the scheduler process is configured to purge any event requests that are in a pending status for a same event object in an events table when there is a refresh of the scheduler process.

9. The system of claim 8, wherein the event manager process, on-demand process, and/or scheduler process captures new execution data when executing a measure.

10. A system for improving operation of computerized manufacturing intelligence system by reducing extra and unnecessary utilization of processor resources and network bandwidth comprising:
one or more computers comprising one or more processors and one or more non-transitory computer readable media, the one or more non-transitory computer readable media including instructions stored thereon that when executed cause the one or more computers to:
implement, by the one or more processors, a runtime environment;
implement, in the runtime environment, an event manager process;
implement, in the runtime environment, a scheduler process; and
implement, in the runtime environment, an on-demand process;
wherein the scheduler process is configured to implement one or more system events in accordance with a periodic schedule;
wherein the on-demand process is configured to implement one or more aperiodic user-requested events in response to receiving a request for the one or more aperiodic user-requested events from a user device; and
wherein the event manager process is configured to automatically consolidate the one or more aperiodic user-requested events and the one or more system events when the one or more aperiodic user-requested events are during a same time period for which the one or more system events are currently processing.

11. The system of claim 10, wherein the event manager process is configured to execute one or more event objects.

12. The system of claim 11, wherein the one or more event objects are one of dimension objects or measure objects.

13. The system of claim 11, wherein the scheduler process is configured to purge an event request that is in a pending status for a same event object when there is a refresh of the scheduler process.

14. The system of claim 11, wherein the scheduler process is configured to purge any event requests that are in a pending status for a same event object in an events table when there is a refresh of the scheduler process.

15. The system of claim 14, wherein when the same event object exists, the scheduler process is configured to purge the same event object by updating a status of the same event object and then delete records from the events table.

16. The system of claim 10, wherein the event manager process, on-demand process, and/or scheduler process captures new execution data when executing a measure.

17. The system of claim 16, wherein the event manager process, on-demand process, and/or scheduler process the measure and checks the measure to avoid overlapping time periods.

18. The system of claim 11, wherein the scheduler process is configured to purge objects to be refreshed by the scheduler process before the one or more event objects are executed.

* * * * *